(12) United States Patent
Chen et al.

(10) Patent No.: US 9,806,639 B2
(45) Date of Patent: Oct. 31, 2017

(54) DIELECTRIC FLUIDS FOR LINEAR SWITCHED CAPACITIVE DEVICES

(71) Applicant: General Electric Company, Schenectady, NY (US)

(72) Inventors: Qin Chen, Schenectady, NY (US); Manoj Ramprasad Shah, Latham, NY (US); Joo Han Kim, Niskayuna, NY (US); Stefan Grubic, Albany, NY (US); Nathaniel Benedict Hawes, Milton, NY (US)

(73) Assignee: General Electric Company, Niskayuna, NY (US)

( * ) Notice: Subject to any disclaimer, the term of this patent is extended or adjusted under 35 U.S.C. 154(b) by 316 days.

(21) Appl. No.: 14/699,775

(22) Filed: Apr. 29, 2015

(65) Prior Publication Data

US 2016/0322918 A1 Nov. 3, 2016

(51) Int. Cl.
*H02N 1/00* (2006.01)
*H01B 3/24* (2006.01)

(52) U.S. Cl.
CPC ............. *H02N 1/002* (2013.01); *H01B 3/24* (2013.01)

(58) Field of Classification Search
CPC .................................. H02N 1/002; H01B 3/24
(Continued)

(56) References Cited

U.S. PATENT DOCUMENTS 4,127,804 A    11/1978  Breaux
4,223,241 A *   9/1980  Paszyc ..................... H02N 1/10
                                                   310/308

(Continued)

FOREIGN PATENT DOCUMENTS

CN    103368452 A    10/2013
JP    H1187172 A      3/1999
(Continued)

OTHER PUBLICATIONS

Matsuzaki et al., "Comparison of Electrostatic and Electromagnetic Motors Based on Fabrication and Performance Criteria", Micro Machine and Human Science, 1994. Proceedings., 1994 5th International Symposium , Issue Date : Oct. 2-4, 1994, Print ISBN: 0-7803-2095-6.

(Continued)

*Primary Examiner* — John K Kim
(74) *Attorney, Agent, or Firm* — Nitin N. Joshi

(57) ABSTRACT

A dielectric fluid includes a first liquid having first dielectric constant and conductivity values. The dielectric fluid also includes a second liquid having second dielectric constant and conductivity values. The first dielectric constant value is greater than the second dielectric constant value and the second electrical conductivity value is less than the first electrical conductivity value. The first and second liquids form an immiscible mixture that has third dielectric constant and conductivity values between the first and second dielectric constant values and the first and second electrical conductivity values, respectively. The first liquid forms a high conductivity phase representative of the first conductivity value, and the second liquid forms a low conductivity phase representative of the second conductivity value. The low conductivity phase is continuous the high conductivity phase is a plurality of droplets non-homogeneously dispersed within, and separated by, the continuous low conductivity phase.

23 Claims, 7 Drawing Sheets

(58) Field of Classification Search
USPC .............................. 310/200, 208, 300, 308
IPC .................... H02N 1/002,1/00; H01B 3/24
See application file for complete search history.

(56) References Cited

U.S. PATENT DOCUMENTS

| | | | |
|---|---|---|---|
| 4,546,292 | A | 10/1985 | Audren et al. |
| 4,595,852 | A | 6/1986 | Gundlach |
| 4,943,750 | A | 7/1990 | Howe et al. |
| 5,262,695 | A | 11/1993 | Kuwano et al. |
| 5,541,465 | A | 7/1996 | Higuchi et al. |
| 5,928,791 | A | 7/1999 | Rosenmayer |
| 6,168,948 | B1 | 1/2001 | Anderson et al. |
| 6,184,607 | B1 | 2/2001 | Cabuz et al. |
| 6,353,276 | B1 | 3/2002 | Gendron |
| 6,359,757 | B1 | 3/2002 | Mallary |
| 6,373,682 | B1 | 4/2002 | Goodwin-Johansson |
| 6,645,403 | B1* | 11/2003 | Park .................. C10M 171/001 252/500 |
| 6,771,002 | B2 | 8/2004 | Jones |
| 6,781,284 | B1 | 8/2004 | Pelrine et al. |
| 6,881,250 | B2 | 4/2005 | Wong et al. |
| 7,088,567 | B2 | 8/2006 | Hunt et al. |
| 7,115,161 | B2 | 10/2006 | Magdassi et al. |
| 7,452,143 | B2 | 11/2008 | Matsuki et al. |
| 7,781,935 | B2 | 8/2010 | Jager et al. |
| 7,877,231 | B2 | 1/2011 | Bharadwaj et al. |
| 8,013,667 | B2 | 9/2011 | Ikehashi |
| 8,278,797 | B2 | 10/2012 | Sashida |
| 8,483,017 | B2 | 7/2013 | Bisig |
| 8,580,384 | B2 | 11/2013 | Zheng et al. |
| 8,618,715 | B2 | 12/2013 | Shimanouchi et al. |
| 8,710,793 | B2 | 4/2014 | Despesse |
| 2009/0201623 | A1 | 8/2009 | Steeneken |
| 2010/0085843 | A1 | 4/2010 | Bisig |
| 2012/0055768 | A1 | 3/2012 | Reimann et al. |
| 2013/0106317 | A1 | 5/2013 | Ludois |
| 2013/0161232 | A1* | 6/2013 | Staack .................. C10G 32/02 208/14 |
| 2013/0300252 | A1 | 11/2013 | Johnson |
| 2014/0175941 | A1 | 6/2014 | Johnson |
| 2014/0300247 | A1* | 10/2014 | Takamatsu .............. F03G 7/005 310/300 |
| 2016/0322918 | A1* | 11/2016 | Chen ........................ H01B 3/24 |

FOREIGN PATENT DOCUMENTS

| | | |
|---|---|---|
| JP | 2012023839 A | 2/2012 |
| WO | 2013168191 A1 | 11/2013 |

OTHER PUBLICATIONS

Niino, T. et al., "Electrostatic Artificial Muscle: Compact, High-Power Linear Actuators with Multiple-Layer Structures," Proceedings IEEE Micro Electro Mechanical Systems an Investigation of Micro Structures, Sensors, Actuators, Machines and Robotic Systems, Jan. 25-28, 1994, pp. 130-135; Print ISBN:0-7803-1833-1.

Cooney, Michael, "DARPA program targets 20-fold increase in robot range, endurance," NetworkWorld.com Community, created Jul. 5, 2012, retrieved from website www.networkworld.com/community/print/80972.

Buehler, Martin. Dynamic locomotion with one, four and six-legged robots. McGill Univ Montreal (Quebec), 2005.

Philp, Sanborn F. "The vacuum-insulated, varying-capacitance machine." Electrical Insulation, IEEE Transactions on 2 (1977): 130-136.

O'Donnell, R. J., et al. "The variable-capacitance machine for off-shore wind generation." (2006): 131-135.

Singh, S. P., Bhim Singh, and M. P. Jain. "Performance characteristics and optimum utilization of a cage machine as capacitance excited induction generator." Energy Conversion, IEEE Transactions on 5.4 (1990): 679-685.

Bakri-Kassem et al., "A parallel-plate MEMS variable capacitor with vertical thin-film comb actuators", Microwave Conference, 2007. European, IEEE Xplore, pp. 1349-1352, Conference Location: Munich, Oct. 9-12, 2007.

Niino T et al., "Dual excitation multiphase electrostatic drive", Industry Applications Conference, 1995. Thirtieth IAS Annual Meeting, IAS '95., Conference Record of the 1995 IEEE, IEEE Xplore, pp. 1318-1325, vol. 2, Conference Location: Orlando, FL, Oct. 8-12, 1995.

"High Power Electrostatic Motor", Shinsei Corporation, downloaded from "http://www.shinsei-motor.com/English" on Jan. 7, 2014 (7 pgs).

Akio Yamamoto et al., "Modeling and identification of an electrostatic motor", Precision Engineering, pp. 104-113, vol. 30, Issue: 1, Jan. 2006.

Chaput, Simon, et al. "A 3.7 V to 200 V highly integrated DC-DC converter with 70.4% efficiency for portable electrostatic MEMS applications." New Circuits and Systems Conference (NEWCAS), 2014 IEEE 12th International. IEEE, 2014.

\* cited by examiner

DIELECTRIC FLUIDS FOR LINEAR SWITCHED CAPACITIVE DEVICES

STATEMENT REGARDING FEDERALLY SPONSORED RESEARCH & DEVELOPMENT

This invention was made with Government support under contract number W31P4Q-13-C-0095 awarded by the Defense Advanced Research Projects Agency (DARPA). The Government has certain rights in this invention.

BACKGROUND

The field of the disclosure relates generally to actuators and motors and, more particularly, to linear switched capacitance actuators and motors.

Many known motors/actuator devices use magnetic fields as a force transfer mechanism rather than electric fields due to the higher energy densities achieved with magnetic fields using conventional materials and configurations. Such known devises are used extensively for operation of larger devices such as valves and dampers. However, they have some disadvantages for smaller applications, such as operation of robot translatables and aviation devices.

At least some other known motors and actuators use electric fields rather than magnetic fields for electro-mechanical energy transfer. A switched capacitance actuator (SCA) is an electric field-based device that demonstrates an improved energy density over earlier electric field-based devices. The electro-mechanical energy conversion is at least partially a result of the change in the device capacitance with respect to rotor translation. Such SCAs are electrostatic motors that include a translatable portion, e.g., a rotor, and a stationary portion, e.g., a stator, and operate in a manner similar to the magnetic field equivalent of the SCA, a switched reluctance motor (SRM). Both the rotor and stator include multiple electrodes that correspond to magnetic poles in a SRM. When voltage is applied to a stator capacitor electrode pair, a rotor electrode will induce relative motion in the rotor to align with the stator capacitor electrode pair. When the voltage on this stator electrode pair is removed, the appropriate next stator electrode pair that is not aligned with the rotor electrode is energized with a voltage to continue the relative motion.

However, such known SCAs do not match electromagnetic machines with respect to the motion inducing shear stress, i.e., total force or torque output per unit rotor surface area. Therefore, to attempt to achieve parity with electromagnetic devices with respect to power-to-weight ratio, at least some known SCAs compensate for the relatively lower shear stress by increasing the active area of the air gap defined by the SCA rotor and stator. According to Gauss' Law, electric field lines are not required to define closed field loops, and in contrast, magnetic field lines form closed loops that originate and terminate on the magnet. Since the electric field lines do not need to be closed, the rotor surface area may be increased by adding active layers. Another strategy to increase the power-to-weight ratio is to increase the shear stress by improving the dielectric breakdown strength within the gap of the SCA. For example this may be achieved through evacuating the SCA casing. The dielectric breakdown strength of vacuum may be much higher than that of air, which allows the strength of the electric fields in the gap to be larger. However, the evacuation configuration increases the complication of the SCA since the device needs to be securely sealed with a vacuum pump. Another example is that increased dielectric breakdown strength within the gap may be achieved by incorporating inert gases such as sulfur hexafluoride ($SF_6$) and increasing the gas pressure to achieve the desired dielectric properties. However, these configurations also increase the complication of the SCA since sealing is again required. Such configurations are difficult to implement in robotic and aviation applications, at least partially due to size and weight constraints.

Other known SCAs have the gaps filled with a high permittivity, low-viscosity, dielectric fluid. The gap fluid is configured for high frequency wave excitation and the resultant high frequency repetition rates facilitate use of liquids with high dielectric permittivity, i.e., relatively strong dielectric constants (K), e.g., deionized water (with a K of approximately 80). In addition to deionized water, such gap fluids may include, without limitation, vegetable oil (K greater than approximately 3.0), silicone oil (K greater than approximately 2.7), fluorinated oils (K of approximately 1.9), alcohol (K greater than approximately 20) and mineral oils (K of approximately 2.0). The power density of the SCAs is significantly increased if it's electrodes are separated by a high K fluid, which significantly increases the electric force between the electrodes, yet allows for free relative motion of the electrodes. Currently, the existing high K liquids also have high electrical conductivity (S), which renders them unsuitable for SCA applications because as the S increases, electrical losses increase, and machine efficiency decreases. Moreover, if the liquid conductivity is too high, the gap will act as a continuous conductive layer between the rotor and stator, thereby significantly altering the electric field distribution desired for an SCA and, as such, reduces the force and power density. For example, liquids with high K, such as water and alcohol, typically also have a high S, i.e., approximately $5.5*10^2$ micro-siemens per meter ($\mu S/m$) and approximately $6.0\ \mu S/m$, respectively. The highly insulating liquids with a relatively low S, such as oils as described above (with an electrical conductivity of approximately $12*10^{-6}\ \mu S/m$), have a relatively low K.

If two liquids, e.g. a high K/high S fluid and a low k/low S fluid, are mixed and they are miscible, the mixture is uniform at the molecular level and a continuous conductive path across the liquid body is formed due to the universal presence of the high S fluid molecules. As a result, while the K increases moderately, the S, and the associated conduction current, increases rapidly. One effort to produce a high K/low S gap fluid includes using nanoparticle suspension instead of an all-liquid mixture. However, in general it is very difficult to achieve a high loading of nanoparticles, e.g., greater than 10 weight percent, which is needed to achieve a substantially increased dielectric constant without causing mixture stability issues and the associated high S.

BRIEF DESCRIPTION

In one aspect, a dielectric fluid is provided. The dielectric fluid includes a first liquid having a first dielectric constant value and a first electrical conductivity value. The dielectric fluid also includes a second liquid having a second dielectric constant value and a second electrical conductivity value. The first dielectric constant value is greater than the second dielectric constant value and the second electrical conductivity value is less than the first electrical conductivity value. The first liquid and the second liquid at least partially form an immiscible mixture thereof. The immiscible mixture has a third dielectric constant value with a value in between the first dielectric constant value and the second dielectric constant value. The immiscible mixture also has a third electrical conductivity value with a value in between the first electrical conductivity value and the second electrical conductivity value. The first liquid forms a high conductivity phase substantially representative of the first electrical conductivity value, and the second liquid forms a low conductivity phase substantially representative of the second electrical conductivity value. The low conductivity phase is substantially continuous within the immiscible mixture and the high conductivity phase is a plurality of droplets non-homogeneously dispersed within the immiscible mixture dispersed and separated by the substantially continuous low conductivity phase. The immiscible mixture is configured to substantially interrupt at least one continuous electrical conduction path within the immiscible mixture.

In a further aspect, a switched capacitive device is provided. The switched capacitive device includes a stationary portion including a plurality of first electrodes and a translatable portion including a plurality of second electrodes positioned in opposition to the plurality of first electrodes. The stationary portion and the translatable portion define a gap therebetween. The gap is at least partially filled with a dielectric fluid that includes a first liquid having a first dielectric constant value and a first electrical conductivity value and a second liquid having a second dielectric constant value and a second electrical conductivity value. The first dielectric constant value is greater than the second dielectric constant value and the second electrical conductivity value is less than the first electrical conductivity value. The first liquid and the second liquid at least partially form an immiscible mixture thereof. The immiscible mixture has a third dielectric constant value with a value in between the first dielectric constant value and the second dielectric constant value. The immiscible mixture also has a third electrical conductivity value with a value in between the first electrical conductivity value and the second electrical conductivity value. The first liquid forms a high conductivity phase substantially representative of the first electrical conductivity value, and the second liquid forms a low conductivity phase substantially representative of the second electrical conductivity value. The low conductivity phase is substantially continuous within the immiscible mixture and the high conductivity phase is a plurality of droplets non-homogeneously dispersed within the immiscible mixture dispersed and separated by the substantially continuous low conductivity phase. The immiscible mixture is configured to substantially interrupt at least one continuous electrical conduction path within the immiscible mixture.

In another aspect, a machine is provided. The machine includes a body, at least one electric power source coupled to the body, and at least one mechanism translatably coupled to the body. The at least one mechanism includes at least one switched capacitive device configured to induce movement of the at least one translatable mechanism. The at least one switched capacitive device includes a stationary portion including a plurality of first electrodes and a translatable portion including a plurality of second electrodes positioned in opposition to the plurality of first electrodes. The stationary portion and said translatable portion define a gap therebetween. The gap is at least partially filled with a dielectric fluid that includes a first liquid having a first dielectric constant value and a first electrical conductivity value and a second liquid having a second dielectric constant value and a second electrical conductivity value. The first dielectric constant value is greater than the second dielectric constant value and the second electrical conductivity value is less than the first electrical conductivity value. The first liquid and the second liquid at least partially form an immiscible mixture thereof. The immiscible mixture has a third dielectric constant value with a value in between the first dielectric constant value and the second dielectric constant value. The immiscible mixture also has a third electrical conductivity value with a value in between the first electrical conductivity value and the second electrical conductivity value. The first liquid forms a high conductivity phase substantially representative of the first electrical conductivity value, and the second liquid forms a low conductivity phase substantially representative of the second electrical conductivity value. The low conductivity phase is substantially continuous within the immiscible mixture and the high conductivity phase is a plurality of droplets non-homogeneously dispersed within the immiscible mixture dispersed and separated by the substantially continuous low conductivity phase. The immiscible mixture is configured to substantially interrupt at least one continuous electrical conduction path within the immiscible mixture.

DRAWINGS

These and other features, aspects, and advantages of the present disclosure will become better understood when the following detailed description is read with reference to the accompanying drawings in which like characters represent like parts throughout the drawings, wherein.

Figure 1:
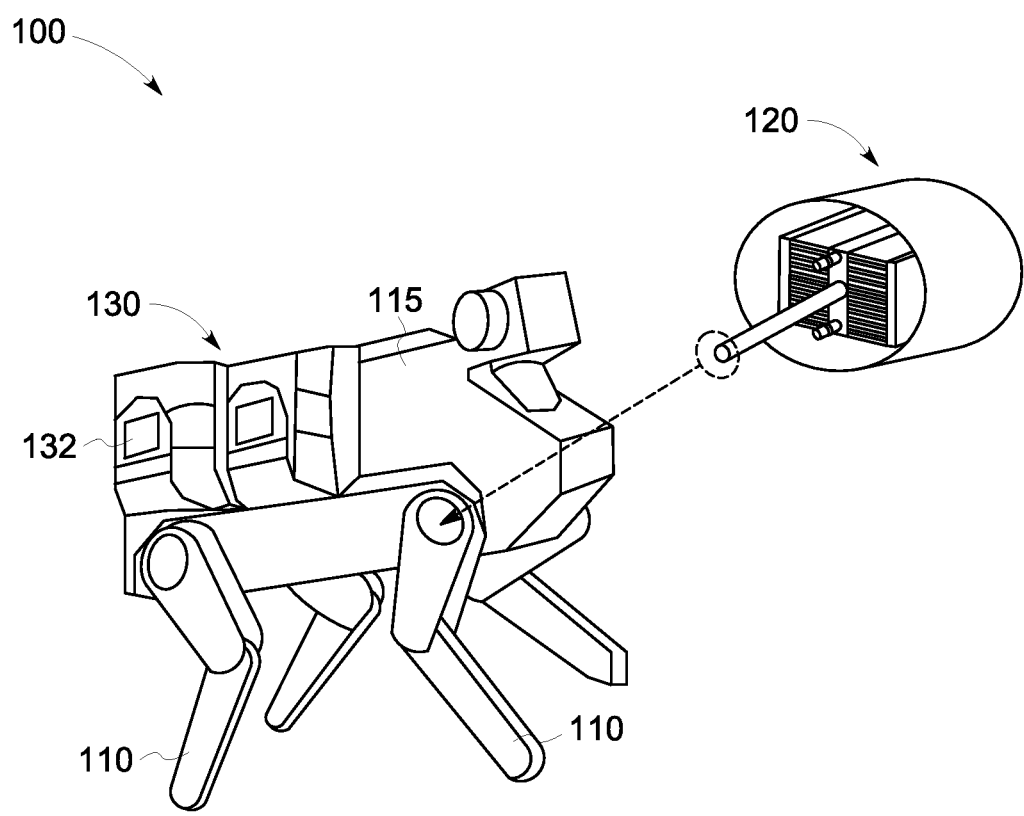
FIG. 1 is a schematic view of an exemplary robotic device that includes exemplary robotic translatables that each include an exemplary switched capacitive actuator (SCA)

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The switched capacitive devices described herein provide a cost-effective method for increasing the energy efficiency of the associated devices and systems. Specifically, in order to achieve higher total energy efficiency for the actuation systems embedded within those systems, a high power switched capacitance actuator (SCA) is used. More specifically, operation of the disclosed SCAs is based on a spatial change of electric fields rather than based on magnetic fields which are used in some conventional EMAs. To increase the effectiveness of force generation through the electric fields, an immiscible mixture of a first liquid having a first dielectric constant value and a first electrical conductivity value and a second liquid having a second dielectric constant value and a second electrical conductivity value is formed. The first dielectric constant value is greater than the second dielectric constant value and the second electrical conductivity value is less than the first electrical conductivity value. Therefore, the immiscible mixture has a third dielectric constant value with a value in between the first and second dielectric constant values and a third electrical conductivity value in between the first and second electrical conductivity values. Also, specifically, the immiscible mixture is at least partially formed with the first liquid non-homogeneously dispersed within the mixture as a plurality of droplets within a predetermined size range through the use of a surfactant mixed therein. Further, specifically, the first liquid forms a high conductivity phase and the second liquid forms a low conductivity phase. The low conductivity phase is substantially continuous within the immiscible mixture and the droplets of the high conductivity phase are dispersed and separated from each other by the substantially continuous low conductivity phase. As such, the potential for forming continuous electrical conduction path within the immiscible mixture is substantially decreased.

The SCAs described herein offer advantages over electromagnetic machines that include, without limitation, sufficient torque generation without using continuous current, removing the requirement of using an iron core as a magnetic conductor, eliminating the need for a yoke, and significantly decreasing the amount of copper in the actuators, thereby decreasing the size, weight, and costs of the actuators. Also, specifically, the SCAs described herein are linear, direct drive SCAs without a transmission gear. Therefore, the embodiments described herein further facilitate decreasing the weight of actuation systems used in mobile and/or translatable machines.

In addition, the SCAs described herein provide for an improved efficiency over that of electromagnetic machines because the losses of the system which include electrical, mechanical, and electromagnetic losses are lower. Specifically, the copper losses in the SCA are smaller than in conventional machines and the dielectric losses can be held small compared to iron losses. Due to the lighter weight and decreased losses, the SCAs described herein demonstrate a high gravimetric power density, i.e., a high power-to-weight ratio. As such, the SCAs described herein provide a light weight, high efficiency linear actuator for applications where the gravimetric power density of the actuator is critical, for example, and without limitation, robotics, aviation, automotive, and wind power applications.

FIG. 1 is a schematic view of an exemplary machine, and more specifically, a robotic device, i.e., a legged robot 100 that includes exemplary translatable mechanisms, i.e., robotic translatables 110 in the form of translatable legs coupled to a robot body 115. In the exemplary embodiment, four translatables 110 are shown. Alternatively, robotic device 100 includes any number of translatables 110 that enables operation of robotic device 100 as described herein. Each of robotic translatables 110 includes at least one switched capacitive device, i.e., at least one switched capacitance actuator (SCA) 120. Legged robot 100 also includes an independent electric power supply system 130 coupled to robot body 115. In the exemplary embodiment, system 130 is a plurality of direct current (DC) batteries 132. Batteries 132 are coupled to SCA 120 through a converter (not shown) that includes, e.g., and without limitation, a direct current-to-alternating current (DC/AC) inverter coupled to a high frequency DC/DC step up converter through a high voltage DC link. Such converters have ratings that include, without limitation, a range of power outputs between 0.1 kilowatt (kW) and 100.0 kW, a range of voltage outputs between 500 volts (rms) and 3000 volts (rms), a range of DC link voltages between 0.8 kilovolts (kV) and 5.0 kV, and an output frequency in a range between 0 Hertz (Hz) and 1000 Hz.

Alternative embodiments of robotic devices include, without limitation, assembly line robots. Such assembly line robots typically include a single robotic arm that includes a device, such as SCA 120 receiving AC power from an alternating current (AC) source through a power converter system that includes an AC/DC boost rectifier coupled to the AC power source, a DC/AC inverter coupled to SCA 120, and a high voltage DC link coupled to the rectifier and the inverter. Such converters have ratings that include, without limitation, a range of power outputs between 0.1 kW and 100.0 kW, a range of voltage outputs between 500 volts (rms) and 3000 volts (rms), a range of DC link voltages between 0.8 kV and 5.0 kV, and an output frequency in a range between 0 Hz and 1000 Hz.

Figure 2:
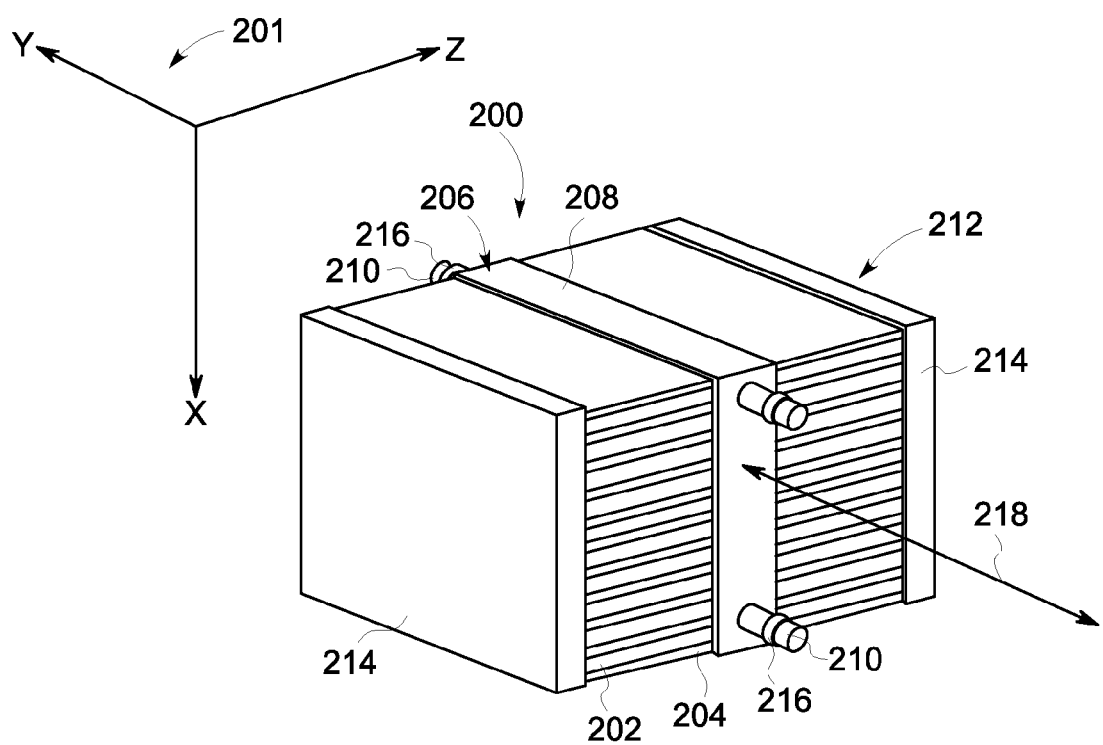
FIG. 2 is a schematic perspective view of an exemplary linear SCA that may be used with the robotic device shown in FIG. 1.

FIG. 2 is a schematic perspective view of an exemplary linear SCA 200 that may be used with robotic device 100 as an exemplary embodiment of SCA 120 (both shown in FIG. 1). A coordinate system 201 includes an x-axis (height direction), a y-axis (longitudinal dimension), and a z-axis (width, or transverse direction) for reference. In the exemplary embodiment, linear SCA 200 includes a translatable assembly 206 that includes a translatable center piece 208 and twenty (20) translatable circuit boards 202. Translatable center piece 208 includes four shafts 210 (only three shown). Translatable circuit boards 202 are manufactured with a precise predetermined thickness and dovetailed into center piece 208 with precise slots (not shown) defined therein. Linear SCA 200 also includes a stationary assembly 212 that includes two side plates 214, twenty-two (22) stator circuit boards 204, and four bearings 216 (only three shown). Stationary circuit boards 204 are manufactured with a precise predetermined thickness and dovetailed into side plates 214 with precise slots (not shown) defined therein. Stationary circuit boards 204 and translatable circuit boards 202 are substantially parallel to each other. Translatable assembly 206 is linearly translatable with respect to stationary assembly 212 with movement of translatable assembly 206 induced in opposing directions parallel to the longitudinal y-axis as indicated by direction of translation arrow 218.

Translatable center piece 208 and side plates 214 are fabricated from electrically insulated structural materials to hold circuit boards 204 and 202, respectively, such that a gap (not shown in FIG. 2) of predetermined dimensions is defined. Such electrically insulated structural materials include any combination of, without limitation, thermosets and thermoplastics. Thermosets include epoxies either unfilled or filled with fillers and fiberglass to improve mechanical and electrical properties. Thermoplastics include selections from a plurality of engineering plastics, e.g., without limitation, polypropylene, polyetherimide, and polycarbonates that may be either filled or unfilled with fillers and fiberglass to improve mechanical and electrical properties.

Linear SCA 200 is configured to induce a shear force in the longitudinal direction in a range between approximately 260 Newtons (N) and approximately 1200 N with a continuous power draw at a translation rate of translatable assembly 206 of approximately 1.25 meters per second (m/s) in a range between approximately 375 Watts (W) and approximately 2500 W. The weight of linear SCA 200 is in a range between approximately 800 grams (g) and approximately 1220 g to provide a gravimetric power density in a range between approximately 375 Watts per kilogram (W/kg) and approximately 2500 W/kg and a gravimetric force density in a range between approximately 300 Newtons per kilogram (N/kg) and approximately 2000 N/kg.

Figure 3:
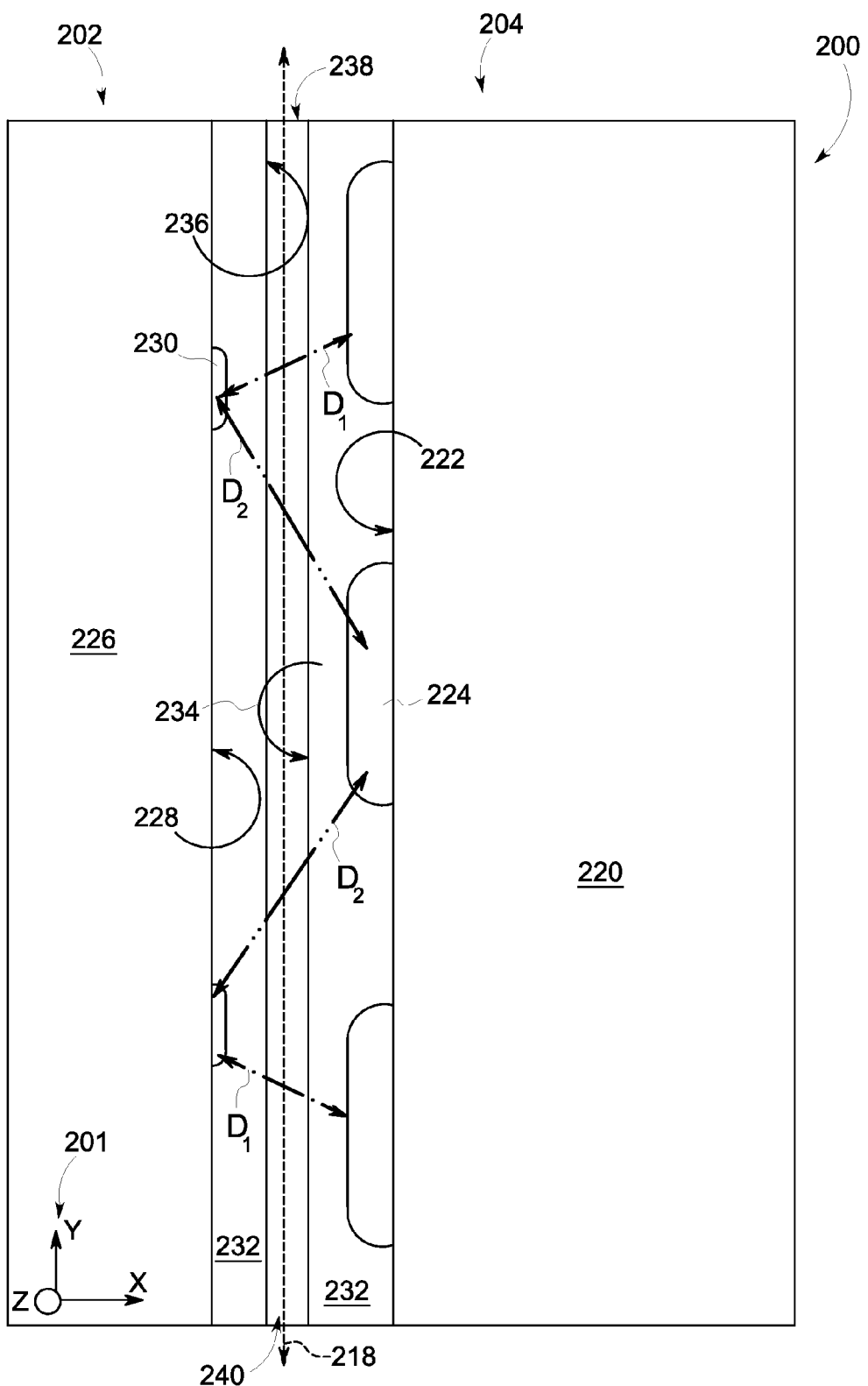
FIG. 3 is a schematic view of a portion of the SCA shown in FIG. 2.

FIG. 3 is a schematic view of a portion of SCA 200 between a translatable circuit board 202 and a stationary circuit board 204. Coordinate system 201, including the x-axis (height direction), the y-axis (longitudinal dimension), and the z-axis (transverse direction), is provided for reference. In the exemplary embodiment, stationary circuit board 204 includes a stationary substrate 220 having a stationary substrate surface 222 and a plurality of stationary electrodes 224 positioned thereon. Similarly, translatable circuit board 202 includes a translatable substrate 226 having a translatable substrate surface 228 and a plurality of translatable electrodes 230 positioned thereon.

Stationary electrodes 224 and translatable electrodes 230 are coupled to stationary substrate surface 222 and translatable substrate surface 228, respectively, through any method that enables operation of linear SCA 200 as described herein, including, without limitation, adhesives, soldering, and brazing, where the adhesive, soldering, and brazing materials (not shown) are structurally, chemically, and electrically compatible with stationary electrodes 224 and stationary substrate 220 and translatable electrodes 230 and translatable substrate 226, respectively. In the exemplary embodiment, stationary substrate 220 and translatable substrate 226 are manufactured from any material that enables operation of linear SCA 200 as described herein, including, without limitation, an epoxy composite with a predetermined permittivity, such as, without limitation, FR-4 and alumina ceramics to facilitate structural support of stationary electrodes 224 and translatable electrodes 230. Further, stationary electrodes 224 and translatable electrodes 230 are formed from any materials that enable operation of linear SCA 200 as described herein.

Also, in the exemplary embodiment, at least one layer of dielectric coatings 232 is formed on each of stationary substrate surface 222 and translatable substrate surface 228. Alternatively, in some embodiments, SCA 200 includes at least one layer of dielectric coatings 232 on only one of stationary substrate surface 222 and translatable substrate surface 228. Dielectric coatings 232 are formed from high permittivity materials, including, without limitation, semicrystalline terpolymer P(VDF-TrFE-CFE), where VDF is vinylidene fluoride, TrFe is trifluoroethylene, and CFE is 1,1-chlorofluoroethylene, and barium titanate ($BaTiO_3$) doped polymers. Dielectric coating 232 formed on stationary substrate surface 222, in some embodiments, is a different material from coating 232 formed on translatable substrate surface 228. Moreover, in some embodiments, dielectric coatings 232 are formed from a plurality of layers, where one or more layers are the same material or one of more layers are a different material. Further, stationary electrodes 224 and translatable electrodes 230 are fully embedded within dielectric coatings 318. Alternatively, stationary electrodes 224 and translatable electrodes 230 are partially embedded within dielectric coatings 232 such that a portion of stationary electrodes 224 and translatable electrodes 230 are exposed. Dielectric coatings 232 facilitate improving performance of SCA 200 by increasing corona and surface flashover voltage, increasing the electrical polarization and hence the power density, and reducing a potential for any ferroelectric hysteresis loss through the proper choice of dielectric material.

Moreover, in the exemplary embodiment, a stationary dielectric coating surface 234 and a translatable dielectric coating surface 236 define a gap 238 filled with a dielectric fluid 240 (discussed further below).

In operation, stationary electrodes 224 and translatable electrodes 230 correspond to the magnetic poles of an SRM. When an adjacent pair of stationary electrodes 224 is energized with a voltage, an electric field (not shown) is induced within gap 238. The electric field includes a plurality of low density distribution regions (not shown) proximate those regions in gap 238 between adjacent stationary electrodes 224 and adjacent translatable electrodes 230 substantially parallel to direction of translation 218. The electric field also includes a plurality of intermediate density distribution regions (not shown) proximate those regions in gap 238 having nonaligned stationary electrodes 224 and translatable electrodes 230. The electric field further includes a plurality of high density distribution regions (not shown) proximate those regions in gap 238 having aligned stationary electrodes 224 and translatable electrodes 230. The strength of the electrical coupling, i.e., the density of the field distribution is proportional to the distance between stationary electrodes 224 and translatable electrodes 230. Therefore, the high density distribution regions and intermediate density distribution regions are proportional to distance $D_1$ and distance $D_2$, respectively. The high density distribution regions induce electric field distribution values within a range between approximately 10 kilovolts (kV) per millimeter (mm) and approximately 30 kV/mm.

Moreover, when an adjacent pair of stationary electrodes 224 is energized with a voltage, a proximate translatable electrode 230 linearly translates to align with stationary electrodes 224. Once the adjacent pair of stationary electrodes 224 and proximate translatable electrodes 230 are aligned, the voltage on this pair of stationary electrodes 224 is removed and the appropriate next pair of stationary electrodes 224 that is not aligned with proximate translatable electrodes 230 is energized with the DC voltage to continue the linear motion as shown by arrow 218. In the exemplary embodiment, stationary electrodes 224 are energized to a value of approximately +3000 volts and translatable electrodes 230, which are grounded, have a voltage of approximately zero volts. Alternatively, any voltages are used that enable operation of SCA 200 as described herein.

To increase and more evenly distribute the force exerted on translatable circuit board 202, multiple stationary electrodes 224 may be energized substantially simultaneously, e.g., without limitation, every other stationary electrode 224. To facilitate such simultaneous energization, an external switching circuit (not shown) may be used to switch the excitation of stationary electrodes 224. Also, SCA 200 may also be energized through a synchronous three-phase power alternating current (AC) system.

Figure 4:
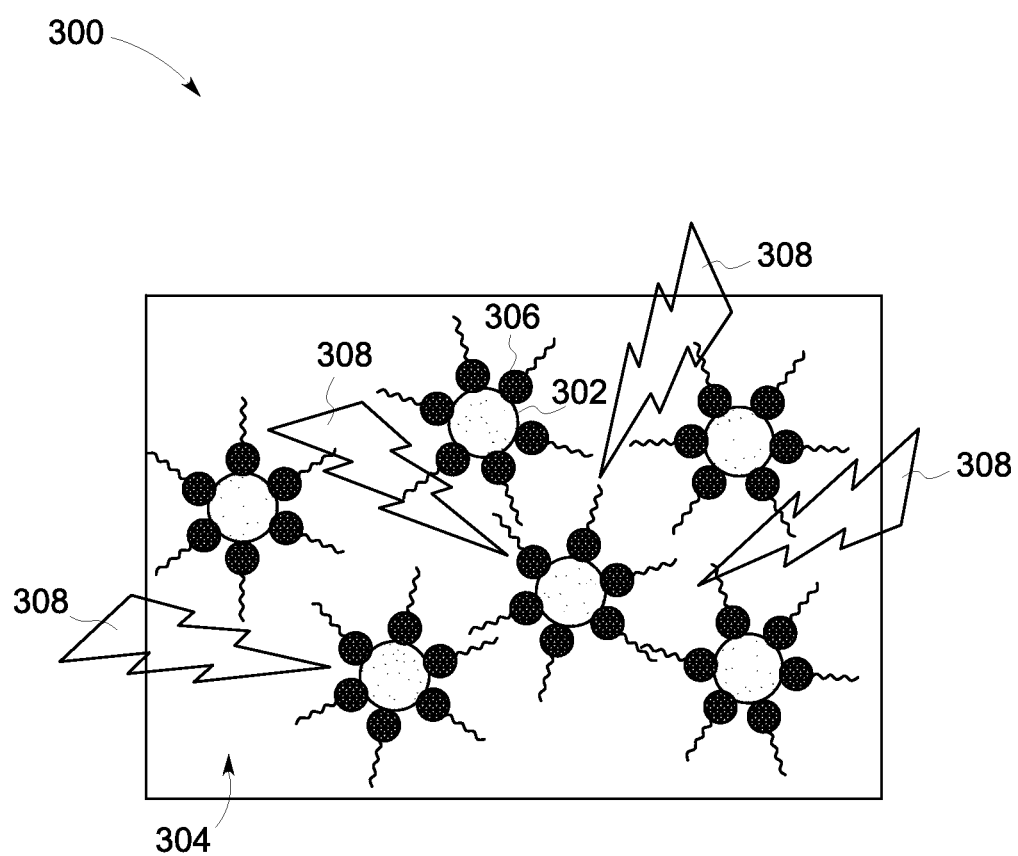
FIG. 4 is a schematic view of an exemplary immiscible mixture that may be used with the SCA shown in FIG. 2.

FIG. 4 is a schematic view of an exemplary immiscible mixture 300 that may be used with SCA 200 (shown in FIG. 2). In the exemplary embodiment, immiscible mixture 300 is a dielectric fluid that includes a first liquid 302, mixed with a second liquid 304. Also, immiscible mixture 300 includes a surfactant 306.

First liquid 302 has a first dielectric constant (K) value and a first electrical conductivity (S) value. In the exemplary embodiment, first liquid 302 is deionized water with a first K value, at an approximately 1000 Hz excitation frequency of SCA 200, within a range between approximately 80 and approximately 5000. Such range is relatively broad due to the dielectric constant and conductivity may vary with the remnant ion density in the water, the temperature, which electrode is used, and the thickness of the water layer. Also, at the excitation frequency of approximately 1000 Hz, deionized water as first liquid 302 has a first S value within a range between approximately $5*10^{-6}$ siemens per meter (S/m) and approximately $1*10^{-3}$ S/m. Such range is relatively broad due to the dielectric constant and conductivity may vary with the remnant ion density in the water, the temperature, which electrode is used, and the thickness of the water layer. Alternatively, first liquid 302 is any liquid with a relatively large K value and a relatively high S value that enables operation of immiscible mixture 300 and SCA 200 as described herein, including, without limitation, alcohol with a nominal K value above 20 and a nominal S value of approximately $6*10^{-4}$ S/m. First liquid 302 is a dispersed medium in the form of water droplets with equivalent diameters within a range between approximately 0.1 micrometers ($\mu$m) and approximately 0.2 $\mu$m. Alternatively, the water droplets of first liquid 302 have any size range that enables operation of immiscible mixture 300 and SCA 200 as described herein, including, without limitation, equivalent diameters within a range between approximately 0.05 $\mu$m and approximately 1 $\mu$m, and within a range between approximately 0.005 $\mu$m and approximately 20 $\mu$m.

Second liquid 304 has a second K value and a second (S) value. In the exemplary embodiment, second liquid 304 is an electrically insulating hydrocarbon oil, including, without limitation, mineral oil with a second K value, at the approximately 1000 Hz excitation frequency of SCA 200, within a range between approximately 1 and approximately 5. Also, at the excitation frequency of approximately 1000 Hz, mineral oil as second liquid 304 has a first S value within a range between approximately $1*10^{-13}$ S/m and approximately $1*10^{-8}$ S/m. Such range is relatively broad due to conductivity may vary with the remnant ion density in the water, the temperature, which electrode is used, and the thickness of the water layer. Alternatively, second liquid 304 is any liquid with a relatively low S that enables operation of immiscible mixture 300 and SCA 200 as described herein, including, without limitation, fluorinated oils. Second liquid 304 is a dispersion medium in which first liquid 302 is dispersed as described above.

In the exemplary embedment, first liquid 302 has a first K value within a range between approximately 80 and approximately 5000 and second liquid 304 has a second K value within a range between approximately 1 and approximately 5. As such, the first K value is approximately two to three orders of magnitude greater than the second K value. Also, first liquid 302 has a first S value within a range between approximately $5*10^{-6}$ S/m and approximately $1*10^{-3}$ S/m and second liquid 304 has a second S value within a range between approximately $1*10^{-13}$ S/m and approximately $1*10^{-8}$ S/m. Therefore, the second S value is approximately three to ten orders of magnitude less than the first S value. As described further below, immiscible mixture 300 has a third K value with a value in between the first K value and the second K value, and a third S value between the first S value and the second S value.

First liquid 302 and second liquid 304 form immiscible mixture 300 that includes two phases. First liquid 302 forms the first phase that is a high dielectric constant/high conductivity phase (hereon referred to as the high conductivity phase) and second liquid 304 forms the second phase that is a low dielectric constant/low conductivity phase (hereon referred to as the low conductivity phase). The high conductivity phases defined by the isolated water droplets of first liquid 302 are effectively separated by the continuous low conductivity phase defined by the continuous mineral oil of second liquid 304 to facilitate interrupting otherwise continuous conduction paths 308. If these two liquids 302 and 304 form a miscible mixture rather than immiscible mixture 300, the miscible mixture appears as uniform at the molecular level, where the high conductivity phase easily forms a continuous conductive path (not shown) across the miscible mixture. As a result, as the concentration of the high conductivity phase increases, and while the dielectric constant increases moderately, the conduction current increases rapidly. As such, a miscible mixture provides for a relatively high dielectric strength constant, however, it also provides for a relatively high electrical conductivity. Therefore, while the two phases still contribute to a sufficiently high dielectric constant of immiscible mixture 300 in a similar manner as for a miscible mixture, the conductivity of immiscible mixture 300 is much lower than the miscible mixture because the high conductivity phases of droplets 302 are effectively separated by the continuous low-conductivity phase of oil 304, and hence continuous conduction paths 308 are interrupted.

In order to achieve a stable emulsion of immiscible mixture 300 rather than a miscible mixture with macroscopic separation, a proper surfactant 306 is used to significantly reduce the surface energy for the interface between the oil/low conductivity and water/high conductivity phases, and hence promote the formation of small and stable droplets 302. The selection of surfactants at least partially depends on the materials of SCA 200. As such, surfactant 306 facilitates forming first liquid 302 into droplets that are non-homogeneously dispersed within immiscible mixture 300. In the exemplary embodiment, surfactant 306 is a nonionic polyethylene glycol oleyl ether with chemical formula $C_{18}H_{35}(OCH_2CH_2)_nOH$, where n=2. Alternatively, surfactant 306 is any surfactant that enables operation of immiscible mixture 300 and SCA 200 as described herein, including, without limitation, for hydrocarbon oils, $C_xH_{2x+1}(OCH_2CH_2)_nOH$, $C_xH_{2x-1}(OCH_2CH_2)_nOH$, and $H(CH_2CH_2)_m(OCH_2CH_2)_nOH$, where x varies from 1 to 20, n varies from 1 to 100, and m varies from 1 to 100. Also, alternatively, for fluorinated oils, fluorosurfactant including, without limitation, $RfCH_2CH_2O(CH_2CH_2O)_xH$, where the group Rf is $F(CF_2CF_2)_y$, and x varies from 1 through 20 and y varies from 3 through 8. Further, alternatively, for fluorinated oils, surfactants $F—(CF_2CF_2)_x—CH_2CH_2O—$ $(CH_2CH_2O)_y$—H, and H—$(CF_2CF_2)_x$—CH2-OH, where x varies from 1 to 10 and y varies from 0 to 25, are used. Moreover, in the exemplary embodiment, surfactant 306 is approximately 2.0 weight percent of immiscible mixture 300. Alternatively, surfactant 306 is added to any weight percent value that enables operation of immiscible mixture 300 and SCA 200 as described herein, including, without limitation, within a range between approximately 0.5 weight percent to approximately 5.0 weight percent.

The moderately strong dielectric strength constant values of immiscible mixture 300 between the K values of first liquid 302 and second liquid 304 with the much lower electrical conductivity values then the high conductivity values of first liquid 302 facilitates increasing the voltage applied to stationary electrodes 224 (shown in FIG. 3), thereby increasing the electrostatic force between stationary electrodes 224 and translatable electrodes 230 across gap 238 and dielectric fluid 240 (all shown in FIG. 3), i.e., immiscible moisture 300, generates increased force and motion output for SCA 200, thereby improving the associated gravimetric power density values. This is due to the force and power density of SCA 200 are at least partially related to the electrical polarization in dielectric medium 240 surrounding electrodes 224 and 230, which in turn is proportional to the dielectric constant of the filling materials, i.e., immiscible mixture 300. In addition, the relatively low conductivity values of dielectric medium 240 surrounding electrodes 224 and 230 facilitates reducing electrical losses in dielectric medium 240, and hence facilitating higher efficiencies and lower heat generation in SCA 200. Furthermore, immiscible mixture 300 includes sufficient density and lubricating properties to facilitate free movement of translatable electrodes 230.

Figure 5:
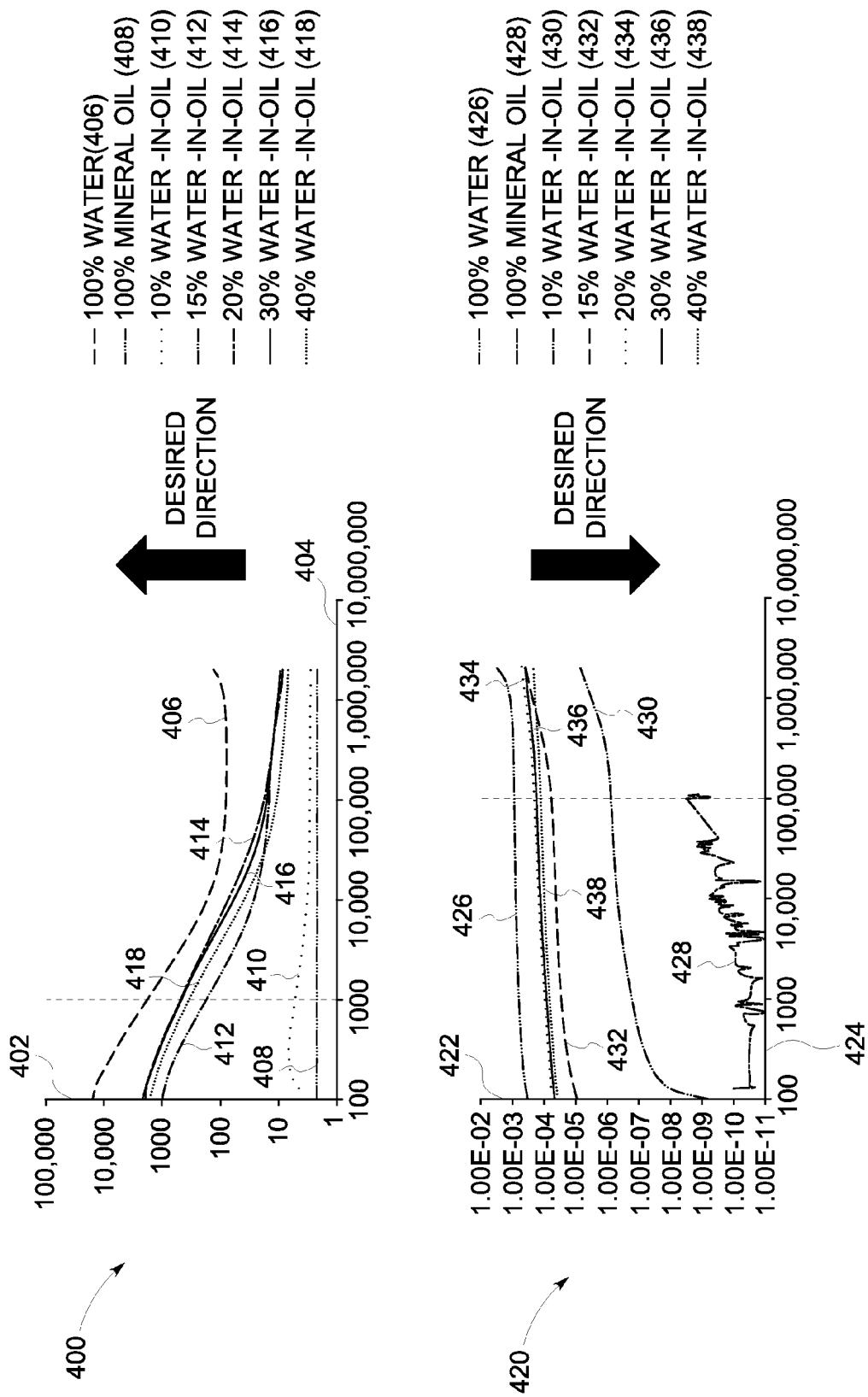
FIG. 5 is a graphical view of the permittivities and conductivities of a plurality of exemplary constituent liquids as a function of operating frequency of the SCA shown in FIG. 2.

FIG. 5 is a graphical view of the dielectric constants and equivalent electrical conductivities of a plurality of exemplary constituent liquids as a function of operating frequency of SCA 200 (shown in FIG. 2). FIG. 5 includes a dielectric constant graph 400 that includes a y-axis 402 defining a logarithmic representation of dielectric constant (K) from 1 ($10^0$) through 100,000 ($10^5$), where the K values are unitless. Graph 400 also includes an x-axis 404 defining a logarithmic representation of excitation frequency of stationary circuit cards 204 (shown in FIGS. 2 and 3) from 100 through 10,000,000 ($10^7$) in units of Hertz (Hz).

Also, graph 400 includes a plurality of dielectric constant versus frequency curves for a plurality of fluids. The uppermost curve is a substantially 100% deionized (DI) water curve 406 and the lowermost curve is a substantially 100% mineral oil curve 408. The graphs between 100% DI water curve 406 and 100% mineral oil curve 408 represent varying weight percents (%) of mineral oil and DI water. Specifically, curve 410 represents a 10% water-in-oil mixture, curve 412 represents a 15% water-in-oil mixture, curve 414 represents a 20% water-in-oil mixture, curve 416 represents a 30% water-in-oil mixture, and curve 418 represents a 40% water-in-oil mixture. A desired direction arrow indicates that higher dielectric constants are preferred over lower dielectric constants.

FIG. 5 also includes a conductivity graph 420 that includes a y-axis 422 defining a logarithmic representation of equivalent electrical conductivity (S) from $1*10^{-11}$ through $1*10^{-2}$, where the S values are in siemens per meter (S/m). Graph 420 also includes an x-axis 424 defining a logarithmic representation of excitation frequency of stationary circuit cards 204 from 100 through 10,000,000 ($10^7$) in units of Hz.

Also, graph 420 includes a plurality of equivalent electrical conductivity versus frequency curves for a plurality of fluids. The uppermost curve is a substantially 100% deionized (DI) water curve 426 and the lowermost curve is a substantially 100% mineral oil curve 428. The graphs between 100% DI water curve 426 and 100% mineral oil curve 428 represent varying weight percents (%) of mineral oil and DI water. Specifically, curve 430 represents a 10% water-in-oil mixture, curve 432 represents a 15% water-in-oil mixture, curve 434 represents a 20% water-in-oil mixture, curve 436 represents a 30% water-in-oil mixture, and curve 438 represents a 40% water-in-oil mixture. A desired direction arrow indicates that lower equivalent electrical conductivities are preferred over higher equivalent electrical conductivities.

In the exemplary embodiment, dielectric fluid 240 (shown in FIGS. 3 and 4) is formed through mixing a first liquid, i.e., DI water having a first, i.e. DI water dielectric constant value and a first, i.e., DI water electrical conductivity value with a second liquid, i.e., mineral oil, having a second, i.e., mineral oil dielectric constant value and a second, i.e., mineral oil electrical conductivity value. The DI water dielectric constant value is greater than the mineral oil dielectric constant value and the mineral oil electrical conductivity value is less than the DI water electrical conductivity value. The DI water and the mineral oil at least partially form immiscible mixture 300 (shown in FIG. 4), i.e., dielectric fluid 240 (shown in FIG. 3) having a third dielectric constant value with a value in between the DI water dielectric constant value and the mineral oil dielectric constant value. In addition, immiscible mixture 300 has a third electrical conductivity value with a value in between the DI water electrical conductivity value and the mineral oil electrical conductivity value.

Also, in the exemplary embodiment, at approximately 1000 Hz excitation frequency, substantially 100% DI water curve 406 identifies a range of DI water dielectric constant values between approximately 80 and approximately 5000 and 100% DI water curve 426 identifies a range of equivalent electrical conductivity values between approximately $5*10^{-6}$ siemens per meter (S/m) and approximately $1*10^{-3}$ S/m. Similarly, at approximately 100,000 Hz, substantially 100% DI water curve 406 identifies a range of DI water dielectric constant between approximately 80 and approximately 100 and 100% DI water curve 426 identifies a range of DI water electrical conductivity values between approximately $5*10^{-6}$ S/m and approximately $1*10^{-3}$ S/m. Such ranges are relatively broad due to the dielectric constants and conductivities may vary with the remnant ion density in the water, the temperature, which electrode is used, and the thickness of the water layer.

Further, in the exemplary embodiment, at approximately 1000 Hz excitation frequency, substantially 100% mineral oil curve 408 identifies a range of dielectric constant values between approximately 1 and approximately 5 and 100% mineral oil curve 428 identifies a range of equivalent electrical conductivity values between approximately $1*10^{-13}$ S/m and approximately $1*10^{-8}$ S/m. Similarly, at approximately 100,000 Hz, substantially 100% mineral oil curve 408 identifies a range of mineral oil dielectric constant values between approximately 1 and approximately 5 and 100% mineral oil curve 428 identifies a range of mineral oil electrical conductivity values between approximately $1*10^{-13}$ S/m and approximately $1*10^{-8}$ S/m. 100% mineral oil curve 428 varies greatly with peaks and valleys in the frequency spectrum under consideration due to the electrical conductivity values being so low, and, as such, curve 428 includes a great amount of noise. Such ranges are relatively broad due to the dielectric constants and conductivities may vary with the remnant ion density in the water, the temperature, which electrode is used, and the thickness of the water layer. Also, conductivity values less than $1*10^{-11}$ are not shown due to the range of y-axis 422.

Further, in the exemplary embodiment, at approximately 1000 Hz, dielectric fluid 240 is represented by 15% water-in-oil mixture curve 412 and 15% water-in-oil mixture curve 432, i.e., the exemplary immiscible mixture is a 15% water-in-oil mixture, Alternatively, any mixture of DI water and mineral oil that enables operation of SCA 200 as described herein is used, including, without limitation, within a range between approximately 10% water-in-oil mixture and approximately 20% water-in-oil mixture. Further, alternatively, the relative mixture of DI water and mineral oil is within a range between approximately 5% water-in-oil mixture and 40% water-in-oil mixture.

At approximately 1000 Hz, 15% water-in-oil mixture curve 412 identifies a range of dielectric constant values for dielectric fluid 240 (immiscible mixture 300) between approximately 150 and approximately 300. Also, 15% water-in-oil mixture curve 432 identifies a range of electrical conductivity values for dielectric fluid 240 between approximately $2*10^{-5}$ S/m and approximately $3*10^{-5}$ S/m. Similarly, at approximately 100,000 Hz, 15% water-in-oil mixture curve 412 identifies a range of dielectric constant values for dielectric fluid 240 between approximately 11 and approximately 20. Further, 15% water-in-oil mixture curve 432 identifies a range of electrical conductivity values for dielectric fluid 240 between approximately $3*10^{-5}$ S/m and approximately $1*10^{-4}$ S/m.

Therefore, in the exemplary embodiment, for 1000 Hz, the dielectric constant value of immiscible mixture 300 (dielectric fluid 240) is between approximately 150 and approximately 300. Also, the dielectric constant value of 100% mineral oil is between approximately 1 and approximately 5. Therefore, there is a difference of approximately two to three orders of magnitude due to the dielectric constant value of deionized water in the range between approximately 80 and approximately 5000. The electrical conductivity for immiscible mixture 300 is between approximately $2*10^{-5}$ S/m and approximately $3*10^{-5}$ S/m. Also, the electrical conductivity for 100% DI water is between approximately $5*10^{-6}$ S/m and approximately $1*10^{-3}$ S/m. Therefore, there is a difference of approximately one to two orders of magnitude due to the extremely low conductivity values of the 100% mineral oil.

Similarly, in the exemplary embodiment, for 100,000 Hz, the dielectric constant value of immiscible mixture 300 (dielectric fluid 240) is between approximately 11 and approximately 20. Also, the dielectric constant value of 100% mineral oil is between approximately 1 and approximately 5. Therefore, there is a difference of approximately one to three orders of magnitude due to the dielectric constant value of deionized water in the range between approximately 80 and approximately 5000. The electrical conductivity for immiscible mixture 300 is between approximately $3*10\text{-}5$ S/m and approximately $1*10^{-4}$ S/m. Further, the electrical conductivity for 100% DI water is between approximately $5*10^{-6}$ S/m and approximately $1*10^{-3}$ S/m. Therefore, there is a difference of approximately one order of magnitude due to the extremely low conductivity values of the 100% mineral oil.

Figure 7:
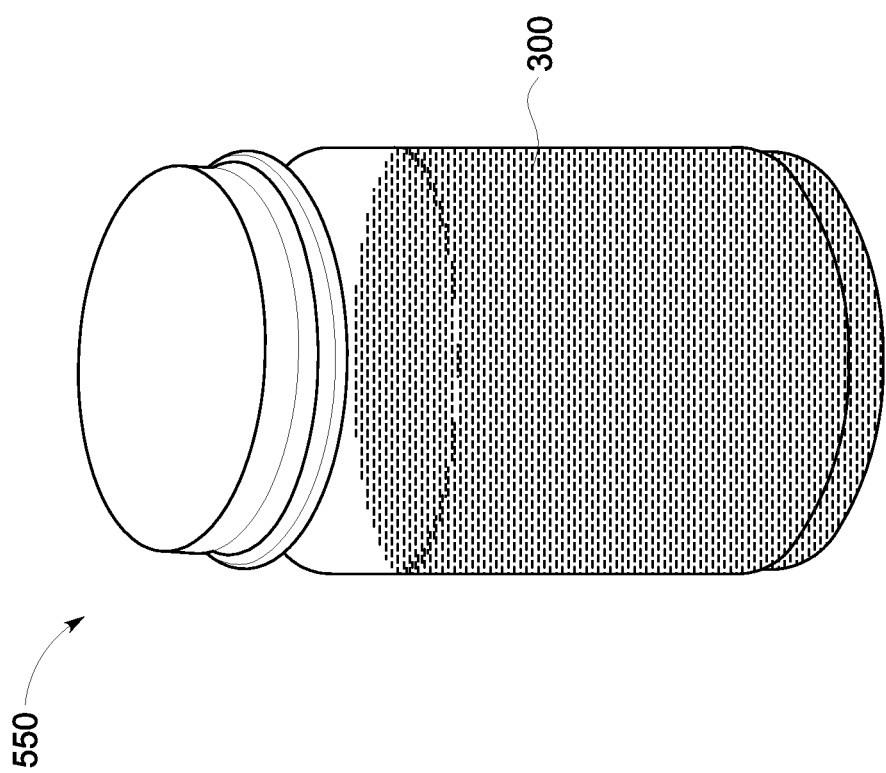
FIG. 7 is a schematic view of an exemplary immiscible mixture that may be used with the SCA shown in FIG. 2.
Figure 6:
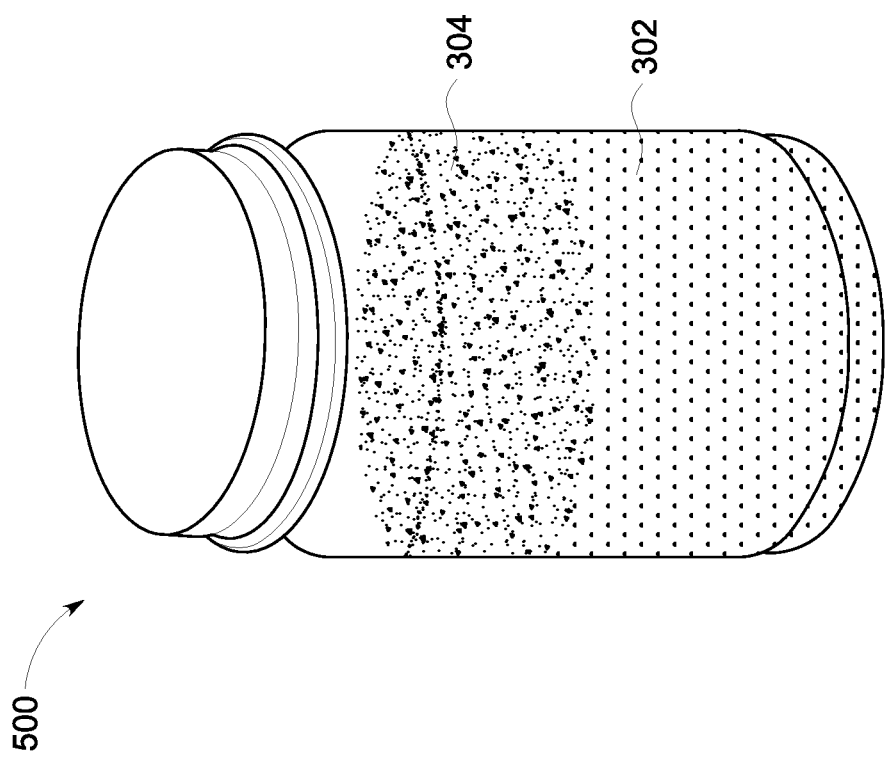
FIG. 6 is a schematic view of an exemplary miscible mixture that shows separation of the constituent liquids.

FIG. 6 is a schematic view of an exemplary miscible mixture 500 that shows macroscopic separation of the constituent liquids, i.e., water 302 and oil 304, due to lack of proper surfactant. FIG. 7 is a schematic view of immiscible mixture 300 that may be used with SCA 200 (shown in FIG. 2). Immiscible mixture 300 includes a properly chosen surfactant. The uniform white color indicates that the two liquids are immiscible at the microscopic level because, otherwise, immiscible mixture 300 would appear transparent. Also, immiscible mixture 300 is uniform on a macroscopic level as indicated by the consistently opaque color.

The use of immiscible liquid mixture 300 in emulsion has three major technical advantages. Firstly, the two phases in the mixture have very similar specific gravities, and hence the precipitation due to gravity is significantly reduced, which promotes the stability of the emulsion. Secondly, the use of an all-liquid system makes it easier to re-disperse the mixture even if phase segregation is caused under certain conditions, which is different from the case of nanoparticle-liquid suspension, where the nanoparticles may precipitate and form a coating on exposed surfaces. Thirdly, the emulsion contains two phases that are separated on the microscopic scale, yet uniform on a macroscopic scale, and hence conduction can be blocked without causing issues due to phase separation on a macroscopic scale.

Figure 8:
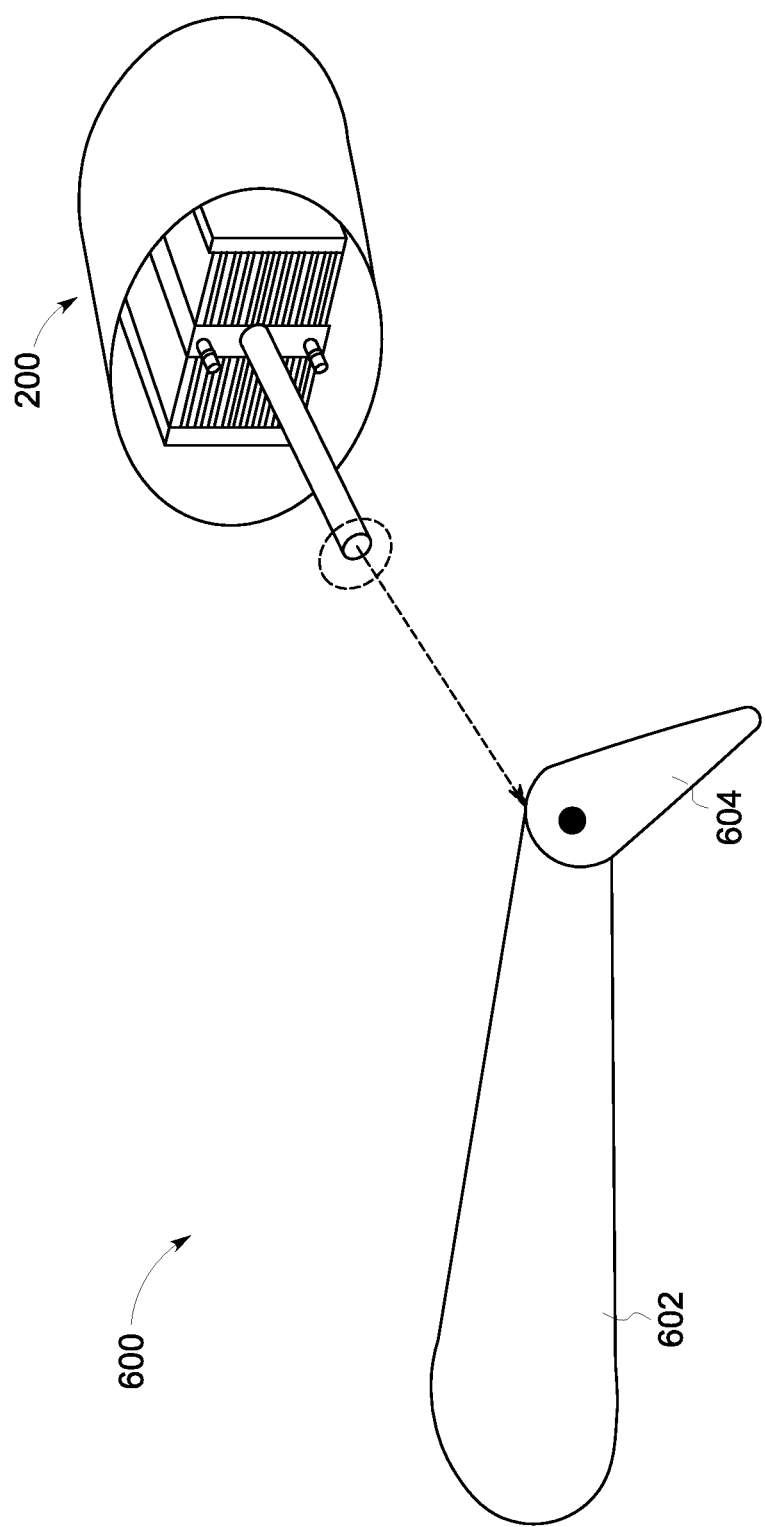
FIG. 8 is a schematic view of an exemplary aircraft component that may use the SCA shown in FIG. 2.

FIG. 8 is a schematic view of another exemplary machine, and more specifically, an aircraft component, i.e., aircraft wing 600 that may use SCA 200. Aircraft wing 600 includes an airfoil portion 602 and a flap portion 604 hingedly coupled to airfoil portion 602 through SCA 200. SCA 200 is energized as described above to hingedly position flap portion 604 through liner translation of SCA 200.

The above-described switched capacitive devices provide a cost-effective method for increasing the energy efficiency of the associated devices and systems. Specifically, in order to achieve higher total energy efficiency for the actuation systems embedded within those systems, a high power switched capacitance actuator (SCA) is used. More specifically, operation of the disclosed SCAs is based on a spatial change of electric fields rather than based on conventional magnetic fields. The SCAs described herein offer advantages over electromagnetic machines that include, without limitation, sufficient torque generation without using continuous current, removing the requirement of using an iron core as a magnetic conductor, eliminating the need for a yoke, and significantly decreasing the amount of copper in the actuators, thereby decreasing the size, weight, and costs of the actuators. Also, specifically, the SCAs described herein are linear, direct drive SCAs without a transmission gear. Therefore, the embodiments described herein further facilitate decreasing the weight of actuation systems used in mobile and/or translatable machines.

In addition, the SCAs described herein provide for an improved efficiency over that of electromagnetic machines because the losses of the system which include electrical, mechanical, and electromagnetic losses are lower. Specifically, the copper losses in the SCA are smaller than in conventional machines and the dielectric losses can be held small compared to iron losses. Due to the lighter weight and decreased losses, the SCAs described herein demonstrate a high gravimetric power density, i.e., a high power-to-weight ratio. As such, the SCAs described herein provide a light weight, high efficiency linear actuator for applications where the gravimetric power density of the actuator is critical, for example, and without limitation, robotics, aviation, automotive, and wind power applications.

An exemplary technical effect of the methods, systems, and apparatus described herein includes at least one of: (a) increasing the energy efficiency of switched capacitance actuators (SCAs); (b) increasing the energy efficiency of systems through high power SCAs; (c) replacing conventional magnetic field-based actuator devices with SCAs based on a spatial change of electric fields; (d) decreasing the weight of the SCAs by eliminating iron cores as magnetic conductors, yokes, and transmission gearing, and significantly decreasing the amount of copper in the SCAs; and (e) increasing the force strength of the SCAs by filing a gap between a stationary circuit board and a translatable circuit board with an immiscible mixture having a relatively high dielectric constant and a relatively low electrical conductivity, thereby facilitating use of stronger electric fields to generate greater motive forces while reducing the potential for excessive electrical arcing within the SCAs.

Exemplary embodiments of switched capacitive devices are described above in detail. The high power SCAs, and methods of operating such systems and devices are not limited to the specific embodiments described herein, but rather, components of systems and/or steps of the methods may be utilized independently and separately from other components and/or steps described herein. For example, the methods may also be used in combination with other systems requiring highly efficient movement of translatable devices, and are not limited to practice with only the systems and methods as described herein. Rather, the exemplary embodiment can be implemented and utilized in connection with many other machinery applications that are currently configured to receive and accept SCAs, e.g., and without limitation, translatable robotic systems in automated assembly facilities.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dielectric fluid comprising:
   a first liquid having a first dielectric constant value and a first electrical conductivity value;
   a second liquid having a second dielectric constant value and a second electrical conductivity value, the first dielectric constant value greater than the second dielectric constant value, the second electrical conductivity value less than the first electrical conductivity value, wherein said first liquid and said second liquid at least partially form an immiscible mixture thereof, said immiscible mixture having a third dielectric constant value with a value in between the first dielectric constant value and the second dielectric constant value, said immiscible mixture having a third electrical conductivity value with a value in between the first electrical conductivity value and the second electrical conductivity value, said first liquid forms a high conductivity phase substantially representative of the first electrical conductivity value, and said second liquid forms a low conductivity phase substantially representative of the second electrical conductivity value, wherein said low conductivity phase is substantially continuous within said immiscible mixture and said high conductivity phase is a plurality of droplets non-homogeneously dispersed within said immiscible mixture dispersed and separated by said substantially continuous low conductivity phase, said immiscible mixture configured to substantially interrupt at least one continuous electrical conduction path within said immiscible mixture; and
   at least one surfactant mixed within said immiscible mixture, said at least one surfactant facilitates forming said first liquid into said plurality of droplets;
   wherein said at least one surfactant is at least one of:
   a flourosurfactant comprising RfCH2CH2O(CH2CH2O)xH, wherein the group Rf is F(CF2CF2)y and x varies from 1 through 20 and y varies from 3 through 8;
   $C_xH_{2x+1}(OCH_2CH_2)_nOH$, wherein x varies from 1 to 20 and n varies from 1 to 100;
   $C_xH_{2x-1}(OCH_2CH_2)_nOH$, wherein x varies from 1 to 20 and n varies from 1 to 100;
   $H(CH_2CH_2)_m(OCH_2CH_2)_nOH$, wherein n varies from 1 to 100 and m varies from 1 to 100;
   F—$(CF_2CF_2)_x$—$CH_2CH_2O$—$(CH_2CH_2O)_y$—H, wherein x varies from 1 to 10 and y varies from 0 to 25; and
   H—$(CF_2CF_2)_x$—CH2—OH, wherein x varies from 1 to 10.

2. The dielectric fluid in accordance with claim 1, wherein said at least one surfactant maintains said droplets of said high conductivity phase to a size within a predetermined range.

3. The dielectric fluid in accordance with claim 1, wherein said first liquid comprises substantially deionized water having:
   at approximately 1000 Hz, a range of first dielectric constant values between approximately 80 and approximately 5000 and a range of first electrical conductivity values between approximately $5*10^{-6}$ siemens per meter (S/m) and approximately $1*10^{-3}$ S/m; and
   at approximately 100,000 Hz, a range of first dielectric constant values between approximately 80 and approximately 100 and a range of first electrical conductivity values between approximately $5*10^{-6}$ S/m and approximately $1*10^{-3}$ S/m.

4. The dielectric fluid in accordance with claim 1, wherein said second liquid comprises an insulating oil having:
   at approximately 1000 Hz, a range of second dielectric constant values between approximately 1 and approximately 5 and a range of second electrical conductivity values between approximately $1*10^{-13}$ S/m and approximately $1*10^{-8}$ S/m; and
   at approximately 100,000 Hz, a range of second dielectric constant values between approximately 1 and approximately 5 and a range of second electrical conductivity values between approximately $1*10^{-13}$ S/m and approximately $1*10^{-8}$ S/m.

5. The dielectric fluid in accordance with claim 1, said immiscible mixture having:
   at approximately 1000 Hz, a range of third dielectric constant values between approximately 150 and approximately 300 and a range of third electrical conductivity values between approximately $2*10^{-5}$ S/m and approximately $3*10^{-5}$ S/m; and at approximately 100,000 Hz, a range of third dielectric constant values between approximately 11 and approximately 20 and a range of third electrical conductivity values between approximately $3*10^{-5}$ S/m and approximately $1*10^{-4}$ S/m.

6. The dielectric fluid in accordance with claim 1, said immiscible mixture comprising said first liquid in a range between approximately 5 weight percent and approximately 40 weight percent.

7. The dielectric fluid in accordance with claim 1, wherein the third dielectric constant value is at least twice the second dielectric constant value and the third electrical conductivity value is at least one order of magnitude less than the first electrical conductivity value.

8. A switched capacitive device comprising:
a stationary portion comprising a plurality of first electrodes; and
a translatable portion comprising a plurality of second electrodes positioned in opposition to said plurality of first electrodes, said stationary portion and said translatable portion define a gap therebetween, wherein said gap is at least partially filled with a dielectric fluid comprising:
a first liquid having a first dielectric constant value and a first electrical conductivity value; and
a second liquid having a second dielectric constant value and a second electrical conductivity value, the first dielectric constant value greater than the second dielectric constant value, the second electrical conductivity value less than the first electrical conductivity value, wherein said first liquid and said second liquid at least partially form an immiscible mixture thereof, said immiscible mixture having a third dielectric constant value with a value in between the first dielectric constant value and the second dielectric constant value, said immiscible mixture having a third electrical conductivity value with a value in between the first electrical conductivity value and the second electrical conductivity value, said first liquid forms a high conductivity phase substantially representative of the first electrical conductivity value, and said second liquid forms a low conductivity phase substantially representative of the second electrical conductivity value, wherein said low conductivity phase is substantially continuous within said immiscible mixture and said high conductivity phase is a plurality of droplets non-homogeneously dispersed within said immiscible mixture dispersed and separated by said substantially continuous low conductivity phase, said immiscible mixture configured to substantially interrupt at least one continuous electrical conduction path within said immiscible mixture;
wherein said first liquid comprises substantially deionized water having:
at approximately 1000 Hz, a range of first dielectric constant values between approximately 80 and approximately 5000 and a range of first electrical conductivity values between approximately $5*10^{-6}$ siemens per meter (S/m) and approximately $1*10^{-3}$ S/m; and
at approximately 100,000 Hz, a range of first dielectric constant values between approximately 80 and approximately 100 and a range of first electrical conductivity values between approximately $5*10^{-6}$ S/m and approximately $1*10^{-3}$ S/m.

9. The switched capacitive device in accordance with claim 8 further comprising at least one surfactant mixed within said immiscible mixture, said at least one surfactant facilitates forming said first liquid into said plurality of droplets.

10. The switched capacitive device in accordance with claim 9, wherein said at least one surfactant is at least one of:
a flourosurfactant comprising RfCH2CH2O(CH2CH2O)xH, wherein the group Rf is F(CF2CF2)y and x varies from 1 through 20 and y varies from 3 through 8;
$C_xH_{2x+1}(OCH_2CH_2)_nOH$, wherein x varies from 1 to 20 and n varies from 1 to 100;
$C_xH_{2x-1}(OCH_2CH_2)_nOH$, wherein x varies from 1 to 20 and n varies from 1 to 100;
$H(CH_2CH_2)_m(OCH_2CH_2)_nOH$, wherein n varies from 1 to 100 and m varies from 1 to 100;
F—$(CF_2CF_2)_x$—$CH_2CH_2O$—$(CH_2CH_2O)_y$—H, wherein x varies from 1 to 10 and y varies from 0 to 25; and
H—$(CF_2CF_2)_x$—$CH_2$—OH, wherein x varies from 1 to 10.

11. The switched capacitive device in accordance with claim 9, wherein said at least one surfactant maintains said droplets of said high conductivity phase to a size within a predetermined range.

12. The switched capacitive device in accordance with claim 8, wherein said second liquid comprises an insulating oil having:
at approximately 1000 Hz, a range of second dielectric constant values between approximately 1 and approximately 5 and a range of second electrical conductivity values between approximately $1*10^{-13}$ S/m and approximately $1*10^{-8}$ S/m; and
at approximately 100,000 Hz, a range of second dielectric constant values between approximately 1 and approximately 5 and a range of second electrical conductivity values between approximately $1*10^{-13}$ S/m and approximately $1*10^{-8}$ S/m.

13. The switched capacitive device in accordance with claim 8, said immiscible mixture having:
at approximately 1000 Hz, a range of third dielectric constant values between approximately 150 and approximately 300 and a range of third electrical conductivity values between approximately $2*10^{-5}$ S/m and approximately $3*10^{-5}$ S/m; and
at approximately 100,000 Hz, a range of third dielectric constant values between approximately 11 and approximately 20 and a range of third electrical conductivity values between approximately $3*10^{-5}$ S/m and approximately $1*10^{-4}$ S/m.

14. The switched capacitive device in accordance with claim 8, said immiscible mixture comprising said first liquid in a range between approximately 5 weight percent and approximately 40 weight percent.

15. The switched capacitive device in accordance with claim 8, wherein the third dielectric constant value is at least twice the second dielectric constant value and the third electrical conductivity value is at least one order of magnitude less than the first electrical conductivity value.

16. A machine comprising:
a body;
at least one electric power source coupled to said body; and
at least one mechanism translatably coupled to said body, said at least one mechanism comprising at least one switched capacitive device configured to induce movement of said at least one translatable mechanism, said at least one switched capacitive device comprising:
a stationary portion comprising a plurality of first electrodes; and
a translatable portion comprising a plurality of second electrodes positioned in opposition to said plurality of first electrodes, said stationary portion and said translatable portion define a gap therebetween, wherein said gap is at least partially filled with a dielectric fluid comprising:
a first liquid having a first dielectric constant value and a first electrical conductivity value; and
a second liquid having a second dielectric constant value and a second electrical conductivity value, the first dielectric constant value greater than the second dielectric constant value, the second electrical conductivity value less than the first electrical conductivity value, wherein said first liquid and said second liquid at least partially form an immiscible mixture thereof, said immiscible mixture having a third dielectric constant value with a value in between the first dielectric constant value and the second dielectric constant value, said immiscible mixture having a third electrical conductivity value with a value in between the first electrical conductivity value and the second electrical conductivity value, said first liquid forms a high conductivity phase substantially representative of the first electrical conductivity value, and said second liquid forms a low conductivity phase substantially representative of the second electrical conductivity value, wherein said low conductivity phase is substantially continuous within said immiscible mixture and said high conductivity phase is a plurality of droplets non-homogeneously dispersed within said immiscible mixture dispersed and separated by said substantially continuous low conductivity phase, said immiscible mixture configured to substantially interrupt at least one continuous electrical conduction path within said immiscible mixture;
wherein said second liquid comprises an insulating oil having:
at approximately 1000 Hz, a range of second dielectric constant values between approximately 1 and approximately 5 and a range of second electrical conductivity values between approximately $1*10^{-13}$ S/m and approximately $1*10^{-8}$ S/m; and
at approximately 100,000 Hz, a range of second dielectric constant values between approximately 1 and approximately 5 and a range of second electrical conductivity values between approximately $1*10^{-13}$ S/m and approximately $1*10^{-8}$ S/m.

17. The machine in accordance with claim 16 further comprising at least one surfactant mixed within said immiscible mixture, said at least one surfactant facilitates forming said first liquid into said plurality of droplets.

18. The machine in accordance with claim 17, wherein said at least one surfactant is at least one of:
a flourosurfactant comprising RfCH2CH2O(CH2CH2O)xH, wherein the group Rf is F(CF2CF2)3-8 and x varies from 1 through 20;
$C_xH_{2x+1}(O)_nOH$, wherein x varies from 1 to 20 and n varies from 1 to 100;
$C_xH_{2x-1}(O)_nOH$, wherein x varies from 1 to 20 and n varies from 1 to 100;
$H_mO_nOH$, wherein n varies from 1 to 100 and m varies from 1 to 100;
F—(CF$_2$CF$_2$)$_x$—CH$_2$CH$_2$O—(CH$_2$CH$_2$O)$_y$—Hm, wherein x varies from 1 to 10 and y varies from 0 to 25; and
H—(CF$_2$CF$_2$)$_x$—CH$_2$—OH, wherein x varies from 1 to 10.

19. The machine in accordance with claim 18, wherein said at least one surfactant maintains said droplets of said high conductivity phase to a size within a predetermined range.

20. The machine in accordance with claim 16, wherein said first liquid comprises substantially deionized water having:
at approximately 1000 Hz, a range of first dielectric constant values between approximately 80 and approximately 5000 and a range of first electrical conductivity values between approximately $5*10^{-6}$ siemens per meter (S/m) and approximately $1*10^{-3}$ S/m; and
at approximately 100,000 Hz, a range of first dielectric constant values between approximately 80 and approximately 100 and a range of first electrical conductivity values between approximately $5*10^{-6}$ S/m and approximately $1*10^{-3}$ S/m.

21. The machine in accordance with claim 16, said immiscible mixture having:
at approximately 1000 Hz, a range of third dielectric constant values between approximately 150 and approximately 300 and a range of third electrical conductivity values between approximately $2*10^{-5}$ S/m and approximately $3*10^{-5}$ S/m; and
at approximately 100,000 Hz, a range of third dielectric constant values between approximately 11 and approximately 20 and a range of third electrical conductivity values between approximately $3*10^{-5}$ S/m and approximately $1*10^{-4}$ S/m.

22. The machine in accordance with claim 16, said immiscible mixture comprising said first liquid in a range between approximately 5 weight percent and approximately 40 weight percent.

23. The machine in accordance with claim 16, wherein the third dielectric constant value is at least twice the second dielectric constant value and the third electrical conductivity value is at least one order of magnitude less than the first electrical conductivity value.

* * * * *